W. R. BEARCE.
FLUID TIGHT SWIVEL JOINT.
APPLICATION FILED JUNE 11, 1915.
1,205,504.
Patented Nov. 21, 1916.
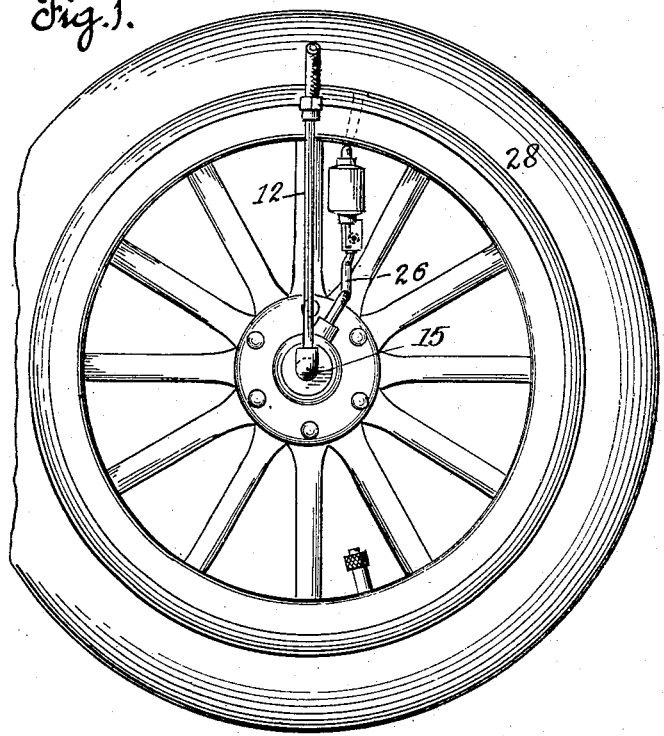
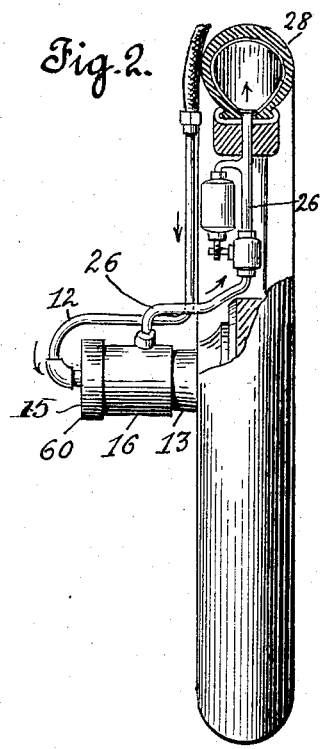
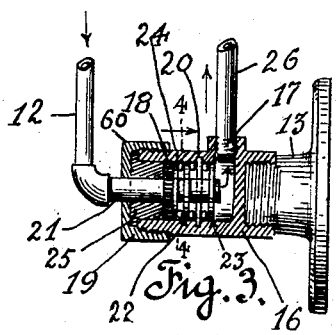
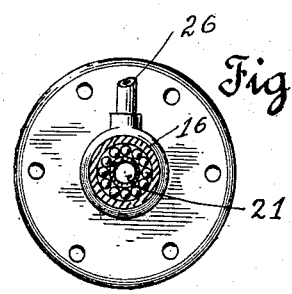
Inventor,
Wilson R. Bearce

UNITED STATES PATENT OFFICE.

WILSON R. BEARCE, OF SAWTELLE, CALIFORNIA, ASSIGNOR OF ONE-THIRD TO REES J. JONES, OF SAWTELLE, CALIFORNIA, AND ONE-THIRD TO FRANCESCO HAMMOND, OF CASEY, ILLINOIS.

FLUID-TIGHT SWIVEL-JOINT.

1,205,504.     Specification of Letters Patent.     Patented Nov. 21, 1916.

Application filed June 11, 1915. Serial No. 33,499.

*To all whom it may concern:*

Be it known that I, WILSON R. BEARCE, a citizen of the United States, residing at Sawtelle, in the county of Los Angeles and State of California, have invented new and useful Improvements in Fluid-Tight Swivel-Joints, of which the following is a specification.

My invention relates to a fluid tight swivel joint, which, while capable of general use, is especially valuable in connection with apparatus for continuously supplying air to the pneumatic tires of wheels of motor driven vehicles, while the latter are running.

It is an object of this invention to construct a superior swivel joint which is simple, durable and not liable to get out of order.

Other objects will appear hereinafter.

In the accompanying drawings which form a part of this specification, I have illustrated a convenient and practical embodiment of my invention.

Figure 1 is a side elevation of an automobile wheel with a pneumatic tire equipped with the connections for supplying air to the inner tube. Fig. 2 is a front elevation partly in cross section of the construction shown in Fig. 1. Fig. 3 is a detail view in cross section showing the swiveled connection of the conduits at the hub of the wheel. Fig. 4 is a cross sectional view taken on line 4—4 of Fig. 3.

Referring to the drawings, 28 designates the pneumatic tire of the wheel of an automobile to be supplied with air from an air pump or an air reservoir (not shown). An air pipe 12 leads from the source of air under pressure to the hub 13 of said wheel between the lower extremity of which and the hub 13, my improved fluid tight swivel joint is disposed forming a passage between them.

My novel swivel connection at the hub of the wheel is constructed as follows: An internally threaded cap 16 engages the threaded outer end of hub 13. The outer end of said cap constitutes a casing with a short internally threaded nipple 17 extending upwardly therefrom. The outer end of said casing is externally threaded. An internally threaded cap 19 is tightly screwed thereon. A short horizontal pipe 21, connected to pipe 12 by means of an elbow joint, extends into the casing in axial alinement. At the inner end of pipe 21 a pair of collars 22 and 23 are provided which are spaced from an annular retaining flange 20 on the casing from opposite sides thereof. Roller bearings are interposed between said flange and said collars. A washer 24, loosely mounted on pipe 21, is spaced from collar 22 with roller bearings between them. A bushing 25 closes the outer end of the casing and a packing 18 between the bushing and the ring provides an air tight joint. The pipe 21 extends through the bushing 25 which constitutes a bearing for said pipe so that the casing 16 may turn freely with the wheel around said pipe. A cap 60 engages the externally threaded outer end of the casing, holding the different parts constituting the swivel joint, securely in place. Extending from nipple 17 is a conduit 26 leading to the inner tube of the pneumatic tire 28.

From the description of the swiveled joint at the hub of the wheel it will be understood that conduit 26 and hub cap 16 rotate with the wheel of the automobile while pipes 12 and 21 and therefore said wheel are stationary in relation thereto and that the said wheel is in rotatable relation to the stationary pipes 12 and 21. The connection described provides an air tight joint between the air reservoir and the inner tube of the wheel notwithstanding the continuous rotation of the latter.

While I have shown my swivel joint in connection with an apparatus for supplying air to a pneumatic tire of an automobile, it will be understood that the invention is not limited thereto, but may be used wherever a fluid tight swivel joint is desired.

I claim:

A fluid tight swivel joint comprising a casing externally threaded at the outer end and provided with an internal annular retaining flange, a tube in rotatable relation to said casing, said tube axially projecting into said casing, and provided with a pair of collars spaced from said retaining flange on opposite sides thereof, antifriction balls between said flange and said collars, a washer loosely mounted on said tube and spaced from the collar adjacent thereto, antifriction balls interposed between said washer and said adjacent collar, a bushing between the outer end of said casing and said tube through which said tube extends and which constitutes a bearing for the tube so that said casing may turn around said tube, a packing between said bushing and said washer, and a cap engaging the threaded outer end of said casing.

In testimony whereof I have signed my name to this specification.

WILSON R. BEARCE.